July 25, 1967 J. P. MURDOCH 3,332,105
APPARATUS FOR HANDLING OF ANIMAL LIVESTOCK
Filed Oct. 22, 1965 6 Sheets-Sheet 1
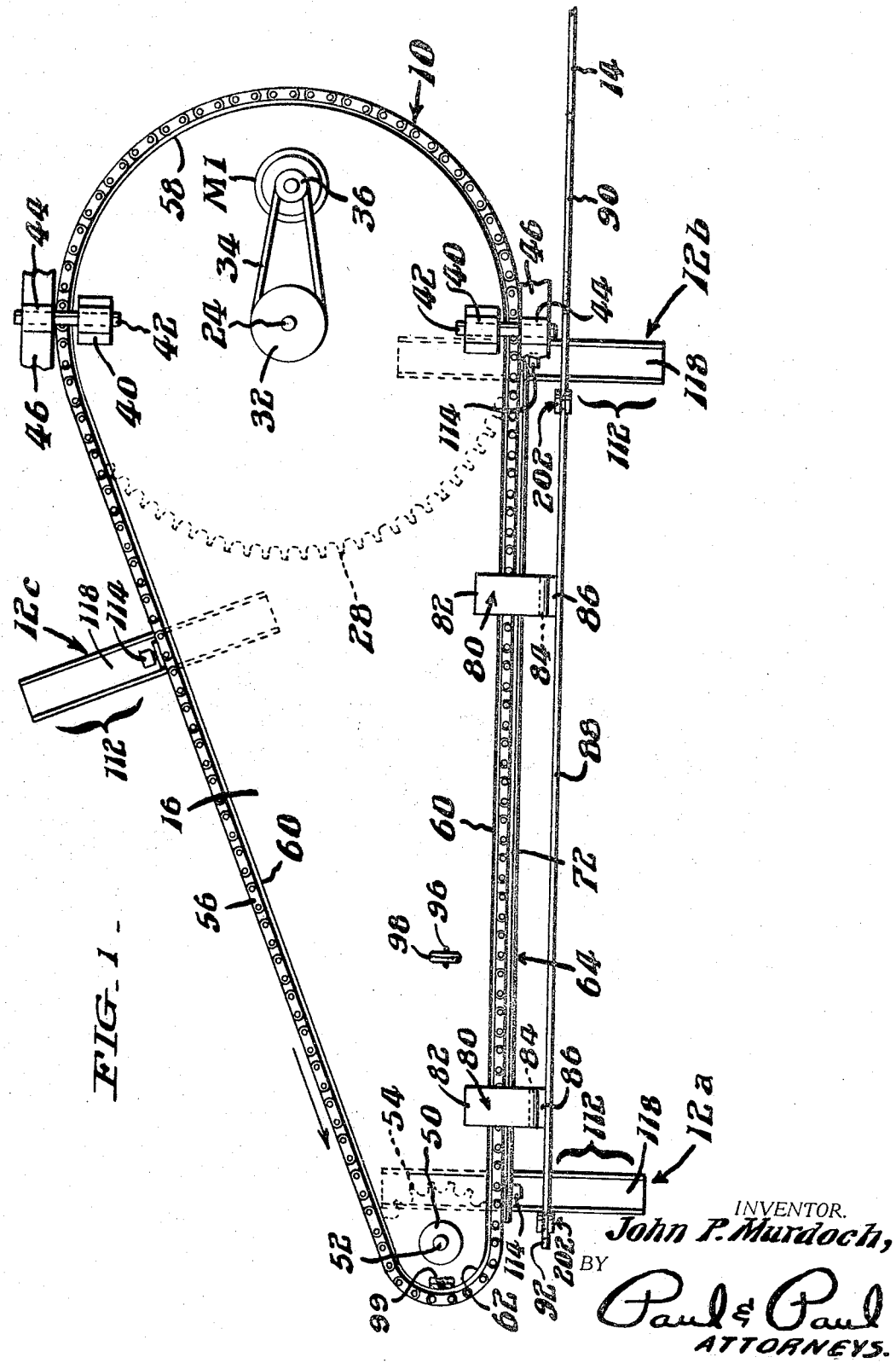

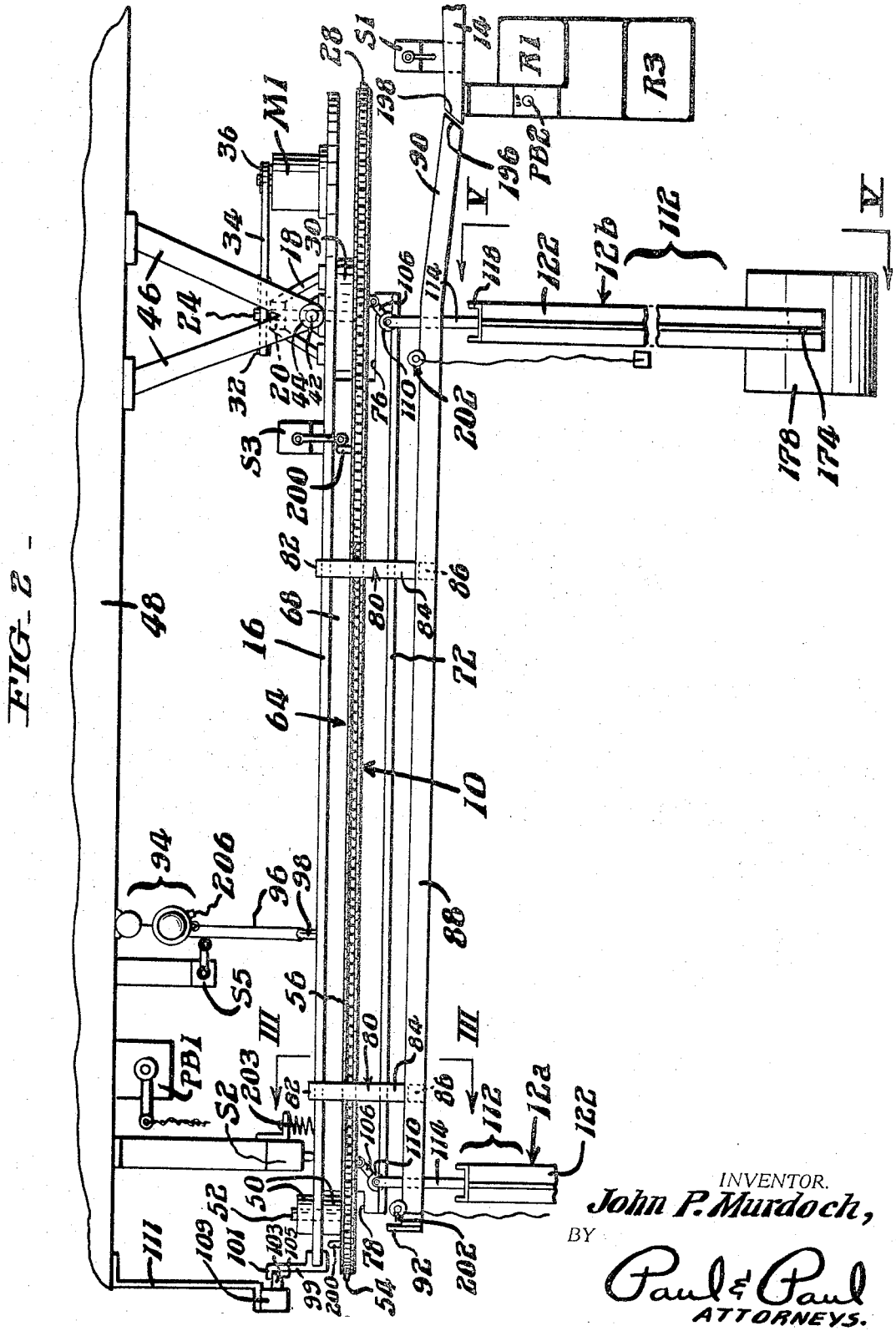

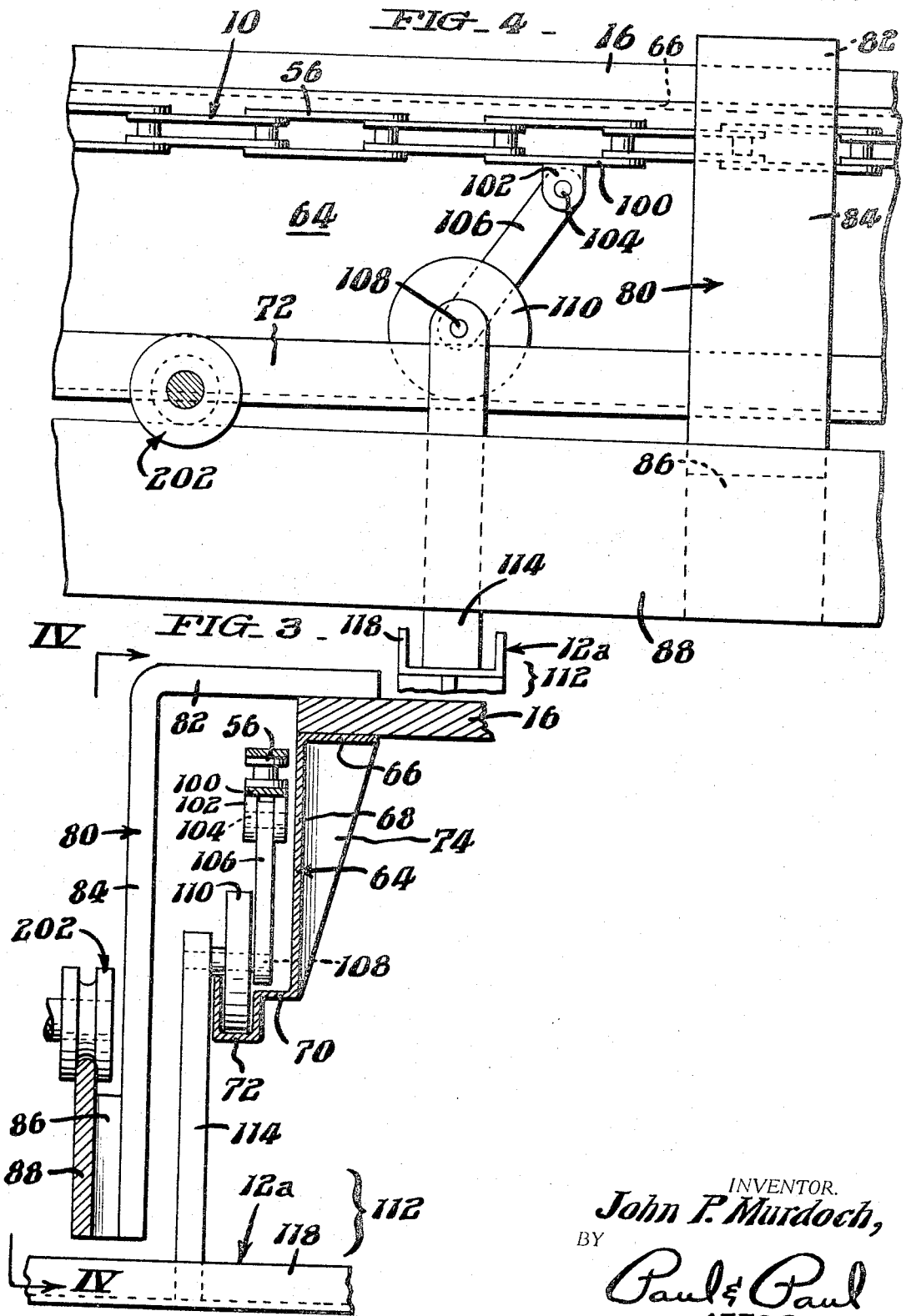

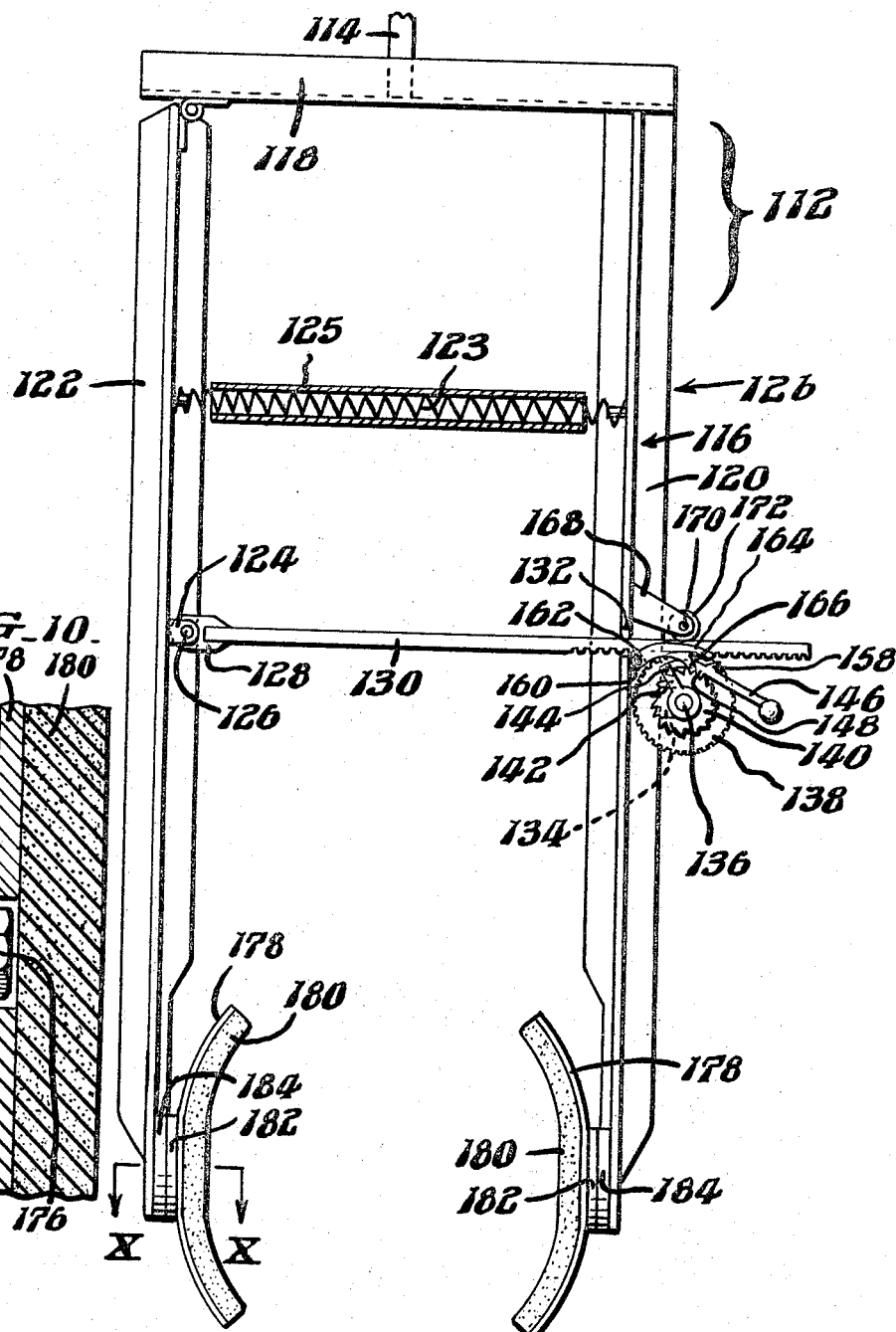

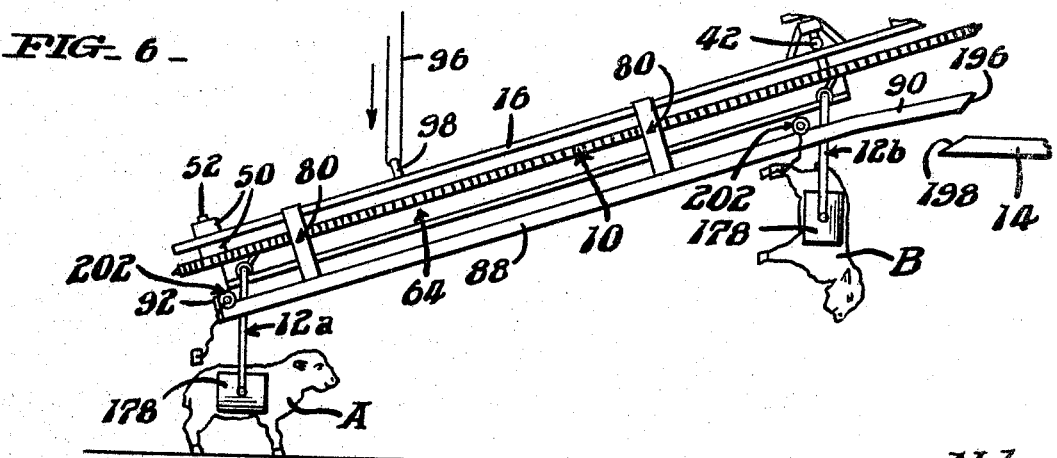
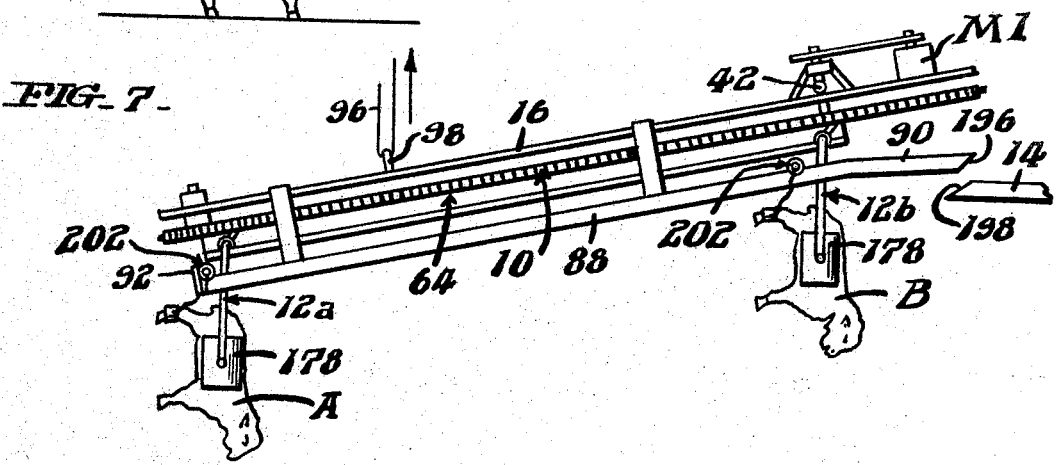
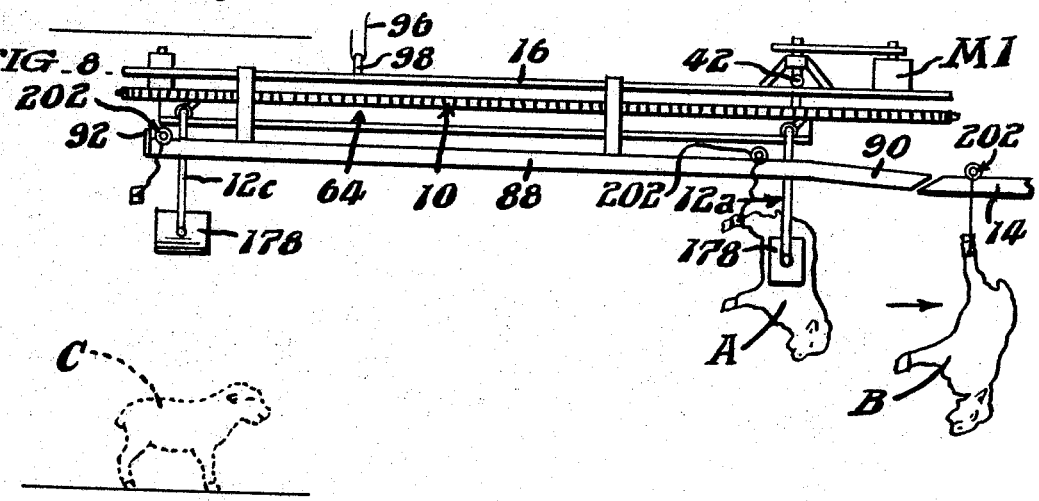

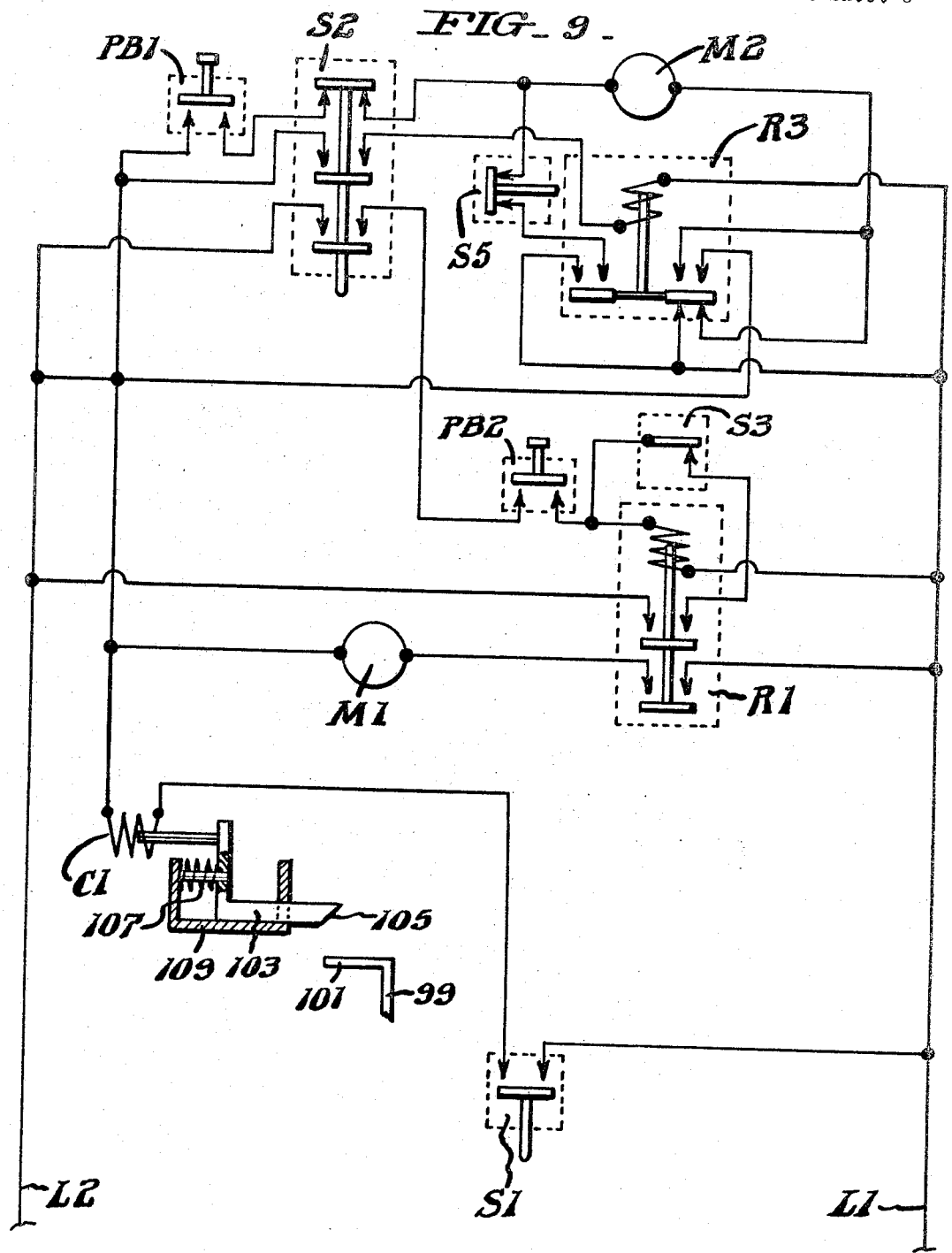

United States Patent Office 3,332,105
Patented July 25, 1967

3,332,105
APPARATUS FOR HANDLING OF ANIMAL LIVESTOCK
John P. Murdoch, 204 Glenn Road, Ardmore, Pa. 19003
Filed Oct. 22, 1965, Ser. No. 501,618
16 Claims. (Cl. 17—24)

ABSTRACT OF THE DISCLOSURE

A conveyor mounts a series of devices for receiving animals and is operable for moving the devices successively through loading, salughtering and idling stations. The conveyor is mounted for vertical swinging movement as a unit between a raised, horizontal position in which the animals are suspended from the conveyor and a lowered, inclined position in which the animal receiving devices are loaded. Shackles are arranged for transferring slaughtered animals suspended from the conveyor to a meat rail for movement away from the conveyor.

---

This invention relates to apparatus for handling animal livestock, and particularly to apparatus for handling small animal livestock, such as sheep, during the course of slaughtering the same.

An important object of the invention is to provide a system for handling such livestock humanely in the course of preparing the animals for slaughtering, irrespective of how they are killed.

Another object is to provide for the efficient handling of such livestock, in connection with slaughtering, in a manner which is considered humane under the provisions of federal and state law, and in a manner pursuant to the principles promulgated by animal humane societies.

Another object is to provide an installation for the handling of livestock, in preparation for their slaughter, which is universally adaptable either for slaughtering in accordance with the ritual requirements of the Jewish faith, or for slaughtering in any other manner.

Another object is to provide a system which lends itself to the handling and slaughtering of successive animals so that a high output capacity may be attained.

Other objects of the invention will become apparent when the following description is read with reference to the accompanying drawings, in which:

FIGURE 1 is a plan view of apparatus constructed in accordance with the invention;

FIGURE 2 is an elevation of the apparatus shown in FIGURE 1;

FIGURE 3 is an enlarged section on lines III—III in FIGURE 2;

FIGURE 4 is an elevation, indicated by line IV—IV in FIGURE 3;

FIGURE 5 is an enlarged view of the animal grasping or clamping unit, indicated by line V—V in FIGURE 2;

FIGURE 6 is an elevation of the apparatus showing the overhead chain conveyor in lowermost, loading position;

FIGURE 7 is similar to FIGURE 6, but shows the conveyor in partially raised, shackling position;

FIGURE 8 is similar to FIGURE 6, but shows the conveyor in fully raised, horizontal position and the animals advanced one station;

FIGURE 9 is a wiring diagram; and

FIGURE 10 is an enlarged section on line X—X in FIGURE 5.

The following description is directed to the specific form of the invention disclosed in the drawings, and is not directed to the scope of the invention, which may be practiced in a variety of forms.

The apparatus constructed in accordance with the invention comprises an overhead chain conveyor, generally designated 10, and a set of three clamping units, generally designated 12a, 12b and 12c.

The overhead chain conveyor 10 includes a rigid frame member in the form of a plate 16 upon which is mounted a bearing support 18 carrying a bearing 20 in overlying spaced relation to the plate 16. Mounted directly upon the plate 16 and axially aligned with the bearing 20 is a companion bearing (not shown). A shaft 24 extends through the bearing 20 and its companion bearing and is suitably provided with collars to secure the shaft against axial movement. The shaft 24 extends through the plate 16, and upon the lower end portion thereof is mounted a large diameter chain sprocket 28 provided with a hub 30 close under the plate 16. Mounted upon the upper end portion of the shaft 24 is a pulley 32 about which is trained a belt 34. The belt is also trained about a pulley 36 on the shaft of an electric drive motor M1.

Affixed to the plate 16 are a pair of bearings 40 through which extend axially aligned stub shafts 42. The outer ends of the stub shafts are received by a pair of bearings 44, which are carried by bearing supports 46 suspended from the building structure 48.

At the opposite end of the overhead chain conveyor 10 are a pair of axially aligned bearings 50 disposed respectively on opposite sides of the plate 16 and having a stub shaft 52 extending therethrough. The lower end portion of the stub shaft carries a small diameter chain sprocket 54 close under the plate 16. A conveyor chain 56 is trained about the sprocket 54 and the sprocket 28.

At the drive end of the overhead chain conveyor 10 the plate 16 has a large radius curved edge 58. The opposite sides of the plate 16 converge, as at 60. At the driven end of the conveyor the plate 16 has a small radius curved edge 62.

Underlying one longitudinally extending marginal area of the plate 16 is a member 64, generally of Z-shape in transverse section, the top flange being designated 66, the web 68, and the bottom flange 70. The outer marginal portion of the bottom flange 70 is generally U-shaped in transverse section to provide an open ended track, designated 72. Suitably spaced along the length of the rail 64 are a number of reinforcing plates 74. At the drive end of the conveyor the web 68 is recessed, as at 76, and at the driven end of the conveyor the web is recessed, as at 78.

In addition to the member 64, the plate 16 carries a pair of right angle plate brackets 80, each having a horizontally extending leg 82 and a depending leg 84. Spacers 86 are interposed between the legs 84 and a meat rail 88. The meat rail preferably slopes slightly downwardly away from the loading station and preferably is provided at the drive end of the conveyor with a sharply inclined section 90. A stop 92 is provided at the driven end of the conveyor.

Overlying the plate 16 is a power operated hoist 94 provided with a cable 96 threaded through a lug 98 affixed to the plate 16. The hoist is suspended from the building structure 48.

Affixed to the driven end of the conveyor plate 16 is a bracket 99 provided at its upper end with a part 101 hooked over a catch pin 103 having a beveled end 105. The pin is slidably mounted in a catch housing 109 and urged toward extended, conveyor holding position by a compression spring 107. The catch is carried by a bracket 111.

Equally spaced about the conveyor chain are link bars 100 provided with depending ears 102 through which extend pins 104. Each pin 104 extends through the upper end of a link 106. Extending through the lower end of the link 106 is a pin 108 mounting a roller 110 from which there is suspended a clamp unit 112. The roller 110 is adapted for travel in the track 72.

The clamp unit 112 comprises a hanger bar 114 depending from the pin 108, and a frame, generally designated 116, suspended from the bar 114. The frame includes a crossbar 118 affixed to the bar 114, a stationary leg 120 depending from one end of the crossbar 118 and a leg 122 pivoted to and depending from the opposite end of the bar 118. Interposed between the legs 120 and 122 is a compression spring 123 within a supporting sleeve 125.

Intermediate the opposite end portions of the leg 122 are a pair of laterally spaced ears 124 affixed to the leg 122 and having a pin 126 extending therethrough. Connected to the pin 126 is a plate 128 from which extends a tie member or rack bar 130. The rack bar extends through an opening 132 in the stationary leg 120 and the teeth of the rack bar mesh with those of an underlying pinion 138 carried by a shaft 136. The shaft 136 turns in a bearing 134 carried by the stationary leg 120. The shaft 136 also carries a ratchet wheel 140, affixed to the pinion 138, and an arm 142, the outer end of which mounts a pivot 144 connecting one end of a handle 146 to the arm 142. The handle 146 carries a ratchet pawl 148 engaged with the teeth of the ratchet wheel 140. It also carries a laterally extending projection 158, for a purpose to appear. The stationary leg 120 carries a pair of ears 160 having a pin 162 extending therethrough. Connected to the pin 162 is one end of an arm 164 provided with a holding pawl 166 engaged with the teeth of the ratchet wheel 140. The projection 158 is disposed directly under the free end of the arm 164. Overlying the rack bar 130 is a hold-down roller 172 mounted upon a pin 170 carried by a bracket 168 affixed to the stationary leg 120.

Extending laterally from the lower end portion of each frame leg is a pin 174. Threaded into the free end of the pin 174 is a stud 176. Mounted upon the stud is a disc 182 carrying a jaw plate 178 lined with a rubber pad 180. Also carried by the pin is a disc 184 provided with openings 186 equally spaced thereabout and housing springs 188 urging balls 190 into depressions 192 formed in the disc 182.

It will be noted that the proximate ends of the movable meat rail 88 and a stationary meat rail 14 are beveled respectively as at 196 and 198.

The following description of the general operation of the apparatus starts with the overhead chain conveyor 10 in position for being loaded (FIGURE 6), at which time the clamping unit 12a is lowered over an animal A at a loading station, and an animal B is suspended by clamping unit 12b at a slaughtering station. An empty clamping unit 12c is disposed at an idling station. The weight of that portion of the conveyor to the left of the pivotal axis is substantially counterbalanced by the weight of that portion of the conveyor to the right of the pivotal axis. For this purpose, counterweights (not shown) may be used.

At the beginning of the operating cycle, the opposed jaws 178 of the clamping unit 12a are fully open for receiving an animal. With the animal positioned between the jaws, the latter are manually closed, loosely clamping the animal therebetween, i.e., the leg 122 of frame 116 is pivoted counterclockwise (FIGURE 5) against the influence of spring 123. Rack bar 130 pivots as required on pin 126 and moves to the right, turning pinion 138 and ratchet wheel 140 clockwise. The pawl 166 moves freely over the teeth of ratchet wheel 140 and is operative to hold the ratchet wheel 140 and pinion 138 against turning counterclockwise. Handle 146 is now moved clockwise about shaft 136, whereupon pinion 138 and ratchet wheel 140 turn clockwise and rack bar 130 moves farther to the right, causing the jaws 178 to clamp the body of the animal tighter.

Now switch PB1 is operated, whereupon the hoist 94 operates to raise the loaded end of the conveyor. When the conveyor is partially raised, switch PB1 is released, whereupon operation of the hoist and the upward movement of the conveyor terminate. Thereupon the jaws 178 are turned manually approximately 90 degrees, whereby to position the animal with its head down (FIGURE 7). At the beginning of the turning movement the balls 190 are forced out of the depressions 192 against the influence of springs 188, and upon completion of the turning movement the balls seat in a second pair of depressions 192. A shackling device is then suspended from meat rail 88 and attached to one leg of the animal.

Now switch PB1 is operated a second time, whereupon the hoist 94 operates to raise the conveyor to fully raised, horizontal position (FIGURES 2 and 8). As the conveyor approaches fully raised, horizontal position, the plate 16 engages the lower end portion of a compression spring 203 and the upper end 101 of bracket 99 engages the beveled end 105 of pin 103. Thus spring 203 is compressed, and the pin is cammed back out of the path of the part 101 against the action of spring 107. When the part 101 clears the pin 103, the pin is again extended by action of the spring 107, and the part 101 hooks over the top of the pin. The plate 16 also operates switch S2. This reverses operation of the hoist 94, whereupon upward movement of the conveyor is terminated and a predetermined length of cable is paid out so that the conveyor may be manually relowered if the pin 103 is first retracted.

Now switch PB2 is operated, whereupon the motor M1 (through pulley 36, belt 34 and pulley 32) drives shaft 24. Shaft 24 actuates the large diameter sprocket 28, which drives the conveyor chain 56 and the small diameter sprocket 54 to advance the units 12a, 12b and 12c one station. Thus the animal A is conveyed to the slaughtering station by unit 12a (FIGURE 8). Unit 12b (empty) is conveyed to the idling station. Unit 12c (empty) is conveyed to the loading station. As the unit 12a approaches the slaughtering station, a switch actuator carried by the chain 56, designated 200, trips switch S3, which terminates movement of the conveyor chain 56. At the slaughtering station, the throat of the animal may be cut. Then the handle 146 is raised, whereupon the projection 158 raises the arm 164 to disengage tooth 166 from the teeth of the ratchet wheel 140. Thus the rack bar is freed for movement to the left, and the animal freed of the clamp, is now suspended for the first time from the meat rail by the shackle device. The shackle roller, generally designated 202, now starts down the inclined part 90 of the meat rail, moving by gravity. When the shackle roller begins to move over stationary meat rail 14, it closes switch S1, whereupon the pin 103 is retracted from under the part 101 of the bracket 99. Then the switch S1 reopens and the pin 103 is extended again. In the meantime, the spring 203 depresses the end of the conveyor slightly so that when the pin 103 is extended, it is disposed above the part 101 of the bracket 99, instead of under said part. The operator then pulls the conveyor down manually to its loading position. Thus ends one operating cycle, which is repeated for each animal. While one animal is being loaded, another is slaughtered and transferred to the meat rail. Suitable means is provided for braking the conveyor so that an animal suspended by a clamping unit at the slaughtering station remains suspended there regardless of the inclined position of the conveyor.

Referring particularly to FIGURE 9, the electrical circuit for operating the apparatus includes a normally open push-button switch PB1, and a momentary contact normally open push-button switch PB2. S3 and S5 are normally closed single pole switches. S2 is a three pole switch having normally closed upper contacts and normally open intermediate and lower contacts. S1 is a momentary contact normally open switch. R1 and R3 are relays. C1 is a coil which electrically actuates the pin 103 of the catch. M1 is the main drive motor for the conveyor chain. M2 is the reversible motor of the hoist. L1 and L2 are the conductors of the power line.

The right hand side of hoist motor M2 is connected to conductor L1 through the lower right hand set of contacts of relay R3. When switch PB1 is closed, the left hand side of motor M2 is connected to conductor L2 through the upper contacts of switch S2, and thereupon the motor M2 operates to raise the conveyor. When the conveyor is in partially raised, shackling position (FIGURE 7), PB1 is permitted to reopen, whereupon the circuit through motor M2 is opened and the hoist and conveyor arrested. After the animal is turned head down and shackled, the switch PB1 is closed again, whereupon the motor M2 operates again to raise the conveyor, this time to its fully raised, horizontal position. As the conveyor approaches its fully raised, horizontal position, the switch S2 is operated by the plate member 16. Thereupon, the upper contacts of switch S2 open, whereupon the circuit through motor M2 is opened and the hoist and conveyor arrested again. The conveyor is secured in its fully raised, horizontal position by the catch pin 103. When the upper contacts of switch S2 open the intermediate contacts close, causing relay R3 to operate. The left hand side of motor M2 is connected to the conductor L1 through switch S5 and the left hand contacts of relay R3. The right hand side of motor M2 is connected to conductor L2 through the upper right hand contacts of relay R3. Thus the circuit through motor M2 is reversed and the hoist pays out cable until a lug 206 on the cable actuates switch S5. This opens the circuit through motor M2 and terminates operation of the hoist. The length of cable paid out by the hoist is just sufficient to permit lowering the conveyor to loading position.

The lower end of the coil of relay R1 is connected to the conductor L1. When switch PB2 is operated, the upper end of the coil of relay R1 is connected to the conductor L2 through the lower contacts of switch S2. Therefore the relay R1 operates. The motor M1 is connected across the conductors L1 and L2 through the lower contacts of relay R1. After the switch PB2 reopens, the coil of relay R1 remains energized because it is connected across lines L1 and L2 through the upper contacts of R1 and switch S3. The motor M1 drives the conveyor chain 56, advancing the clamping units 12a, 12b and 12c. As a clamping unit approaches the slaughtering station, the switch S3 is tripped by the associated actuator 200. This opens the holding circuit, deenergizes the coil of relay R1 and reopens the contacts thereof. Thus the circuit through motor M1 is opened, terminating movement of the conveyor chain. The animal's throat is now cut, and the animal is released from the clamping unit and suspended from the meat rail by the shackling device. The roller of the shackling device then starts down the sloping part of the meat rail, by gravity.

The roller of the shackling device now operates switch S1, whereupon the coil C1 is energized. This causes the pin 103 to be retracted against the action of spring 107. When the switch reopens, the coil C1 is deenergized and the pin 103 is again extended by the spring 107. In the meantime, the part 101 of the bracket 99 is lowered by the spring 203 so that the pin 103 no longer prevents lowering of the conveyor. The conveyor is relowered manually to loading position, as it was at the beginning of the cycle.

Obviously, many modifications of the apparatus are possible. For example, the member 64 is shown on the meat rail side of the conveyor. However, such a member might also be employed to advantage on the other side of the conveyor. The meat rail 88 could be straight and horizontal throughout its entire length, instead of being slightly inclined throughout the major portion of its length and sharply inclined, as at 90. A hydraulic lift could be used in place of the hoist 94. Only three clamp units 12 are shown, but others might be employed, as if it is desired to provide a plurality of loading stations. In addition, the clamping jaws 178 might be spring-pressed to secure the animal therebetween, and forced apart against the influence of the springs to release the animal. The conveyor is described as being counterbalanced, but obviously this is not essential.

What is claimed is:

1. In apparatus for handling animal livestock for slaughtering, the combination comprising a conveyor mounted for pivotal movement between a raised, generally horizontal position and a lowered, inclined position, a plurality of means spaced from each other depending from, and mounted for being lowered and raised with, said conveyor, each being operable for releasably grasping the body of an animal, means for raising said conveyor and grasping means, means for actuating said conveyor whereby successively to move each of said grasping means horizontally through loading, slaughtering and idling stations, and means for receiving an animal from the grasping means at said slaughtering station and advancing it along a predetermined path of travel away from said conveyor.

2. The combination according to claim 1 wherein the conveyor includes an elongated horizontally disposed rigid frame member mounted for pivotal movement about a horizontal axis, and an endless chain of articulated links trained about a pair of sprockets mounted upon said frame member for rotation about upright axes and respectively underlying opposite end portions of said frame member.

3. The combination according to claim 2 wherein the chain has a straight run extending between the sprockets, the loading and slaughtering stations being along said run, and the grasping means are equally spaced along said chain.

4. The combination according to claim 3 wherein means depending from the frame member provides an open track extending along the straight run of the conveyor chain between the loading and slaughtering stations, the grasping means, when between said loading and slaughtering stations, being carried by rollers which travel in said track, and, when not between said loading and slaughtering stations, being carried directly by said conveyor chain.

5. The combination according to claim 4 wherein the rollers of the grasping means are connected to the conveyor chain for being pulled thereby onto and along the track from the loading to the slaughtering station.

6. The combination according to claim 4 wherein the movable rail section is at a higher elevation than the stationary rail section, and a portion of the movable rail section at the slaughtering station is turned downwardly to the elevation of the stationary rail section.

7. The combination according to claim 3 wherein the means for receiving an animal from the grasping means comprises a rail extending along the straight run of the conveyor past the slaughtering station including a movable rail section carried by said frame member and a stationary rail section extending in longitudinal continuation of said movable rail section, and shackling means arranged for suspending an animal from, and for traveling over, said rail.

8. The combination according to claim 7 wherein the conveyor is releasably secured in fully raised position by electrically operable means, switch means connected in electric circuit with said electrically operable means is operable by shackling means on the stationary rail section for energizing the electrically operable means.

9. The combination according to claim 2 wherein one of said sprockets is substantially larger in diameter than the other, the chain has a pair of straight runs extending between said sprockets, the loading and slaughtering stations being at opposite ends of one of said runs and the idling station being along the other run, and the grasping means being equally spaced along said chain.

10. The combination according to claim 1 wherein the conveyor includes an elongated horizontally disposed rigid frame member, means at one end of said frame member mounting the same for pivotal movement about a horizontal axis, an endless chain of articulated links trained about a pair of sprockets mounted upon said frame member for rotation about upright axes and respectively underlying opposite end portions of said frame member, and means at the pivoted end of said frame member for driving the associated sprocket, said drive means being disposed on the side of said pivot means remote from the opposite end of said frame member whereby to at least partially counterbalance the weight therof.

11. The combination according to claim 1 wherein each grasping means includes a frame having a pair of legs mounted for movement relative to each other, a pair of jaws respectively carried by said legs for movement therewith and shaped to engage opposite sides of an animal's body, and means for urging said legs toward each other whereby to releasably clamp the animal between said jaws, said jaws being mounted upon said legs for being turned and selectively positioned about a horizontal axis.

12. The combination according to claim 11 wherein the legs of the frame are operatively interconnected for pivotal movement relative to each other, said legs are yieldably urged apart, and the means for urging said legs toward each other includes a tie member spanning said legs and operative for tying said legs together, and means operable against the influence of said means urging said legs apart for selectively varying the effective length of said tie member.

13. The combination according to claim 12 wherein one end portion of the tie member is secured to one leg of the frame, and the means for varying the effective length of said tie member includes coacting rack and pinion carried respectively by the other end portion of said tie member and the other leg of said frame, coacting pawl and ratchet carried by the other leg of said frame, said ratchet being mounted for actuating said pinion, and said pawl being engaged with said ratchet for releasably holding said ratchet, pawl and rack against movement in animal releasing direction.

14. The combination according to claim 13 wherein the means for varying the effective length of the tie member includes means operable manually for moving the ratchet, pinion and rack in animal grasping direction and for disengaging the pawl from the teeth of the ratchet whereby to free said ratchet pinion and rack for movement in animal releasing direction under the influence of the means urging the leg of the frame apart.

15. The combination according to claim 1 wherein the means for raising said conveyor and grasping means includes cable hoist means, switch means connected in electric circuit with the motor of said hoist and operable to automatically reverse operation of said motor and thereby pay out a predetermined length of cable when said conveyor is elevated from loading position to fully raised, horizontal position.

16. The combination accordingly to claim 1 wherein the means for actuating the conveyor and thereby moving the grasping means from station to station includes an electric drive motor, switch means connected in electric circuit with said electric motor and means carried by the conveyor for actuating said switch means whereby to terminate operation of said conveyor each time said grasping means are advanced one station.

References Cited
UNITED STATES PATENTS

| | | | |
|---|---|---|---|
| 1,317,745 | 10/1919 | Watson et al. | 17—24 |
| 3,050,179 | 8/1962 | Arber | 104—164 X |
| 3,113,340 | 12/1963 | Bush et al. | 17—1 |

LUCIE H. LAUDENSLAGER, *Primary Examiner.*